M. E. SMITH.
DIRECTION SIGNAL.
APPLICATION FILED JAN. 18, 1916.
1,263,952.
Patented Apr. 23, 1918.
2 SHEETS—SHEET 1.
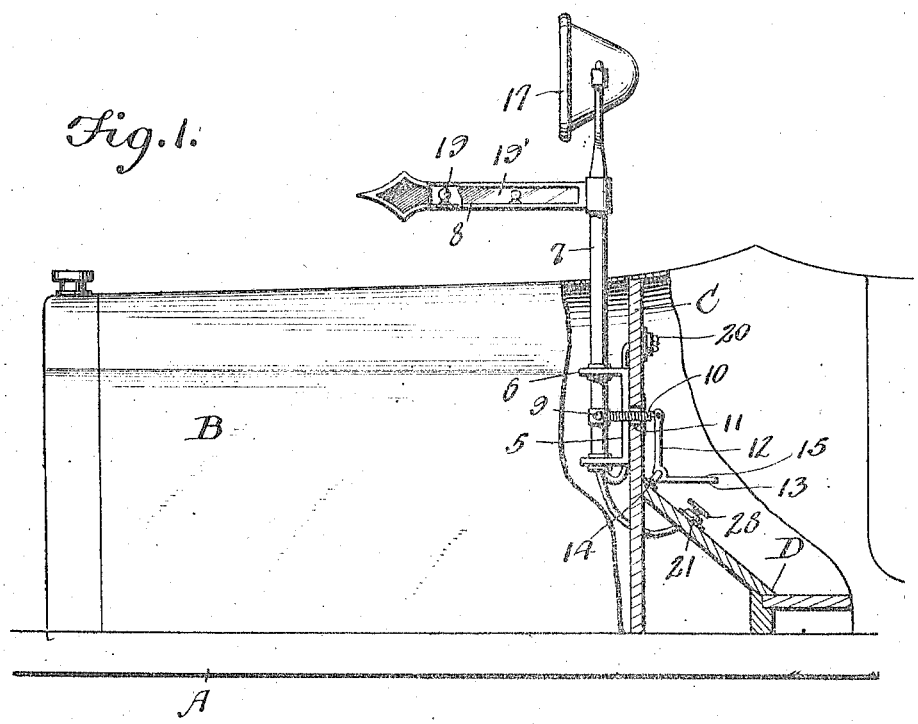
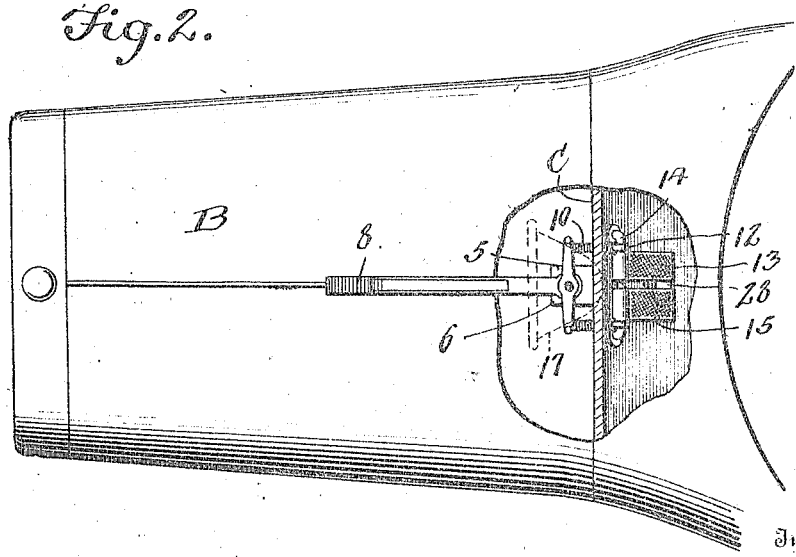
Witnesses
Inventor
M. E. Smith,
By Victor J. Evans
Attorney

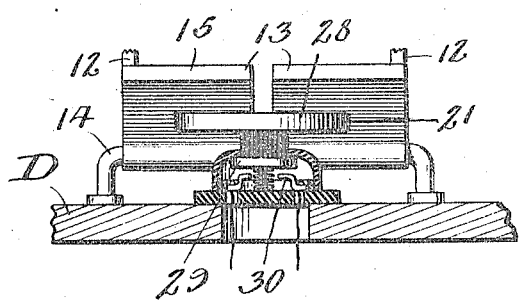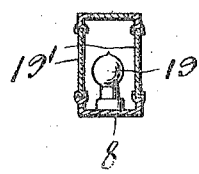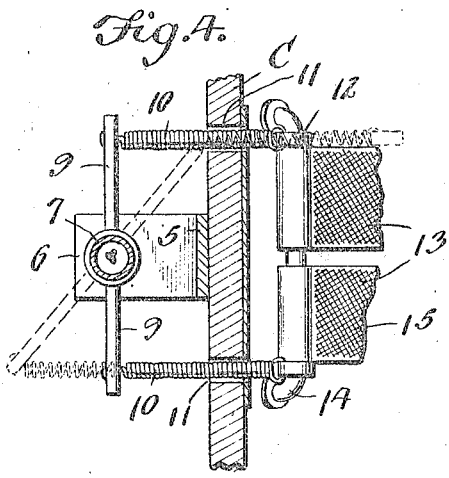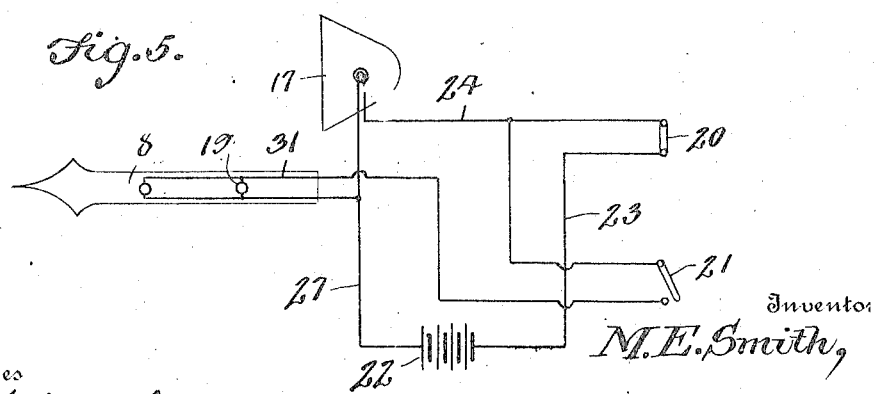

UNITED STATES PATENT OFFICE.

MINNIE E. SMITH, OF WAGONER, ARIZONA.

DIRECTION-SIGNAL.

1,263,952.  Specification of Letters Patent.  Patented Apr. 23, 1918.

Application filed January 18, 1916. Serial No. 72,805.

*To all whom it may concern:*

Be it known that I, MINNIE E. SMITH, a citizen of the United States, residing at Wagoner, in the county of Yavapai and State of Arizona, have invented new and useful Improvements in Direction-Signals, of which the following is a specification.

This invention comprehends the provision of a direction signal primarily intended for use in connection with motor vehicles.

The invention embodies among other features a signal arm adapted to be controlled by a foot operated mechanism, to indicate the course the machine is to take, and is especially advantageous at street crossings and corners in preventing collisions or accidents.

In carrying out my invention I provide a transparent arm adapted to be illuminated intermittently by means under control of the foot operated mechanism, so that the signal will be just as serviceable at night as during the day.

The nature and advantages of the invention will be better understood from the following description when taken in connection with the accompanying drawings, the invention residing in the construction, combination and arrangement of parts as defined in the claim.

In the drawings forming part of this specification like numerals of reference indicate similar parts throughout the several views and wherein:—

Figure 1 is a side elevation of the signal mounted upon the machine, the latter being partly shown in section.

Fig. 2 is a top plan view.

Fig. 3 is an enlarged detail view showing the position of the normally open switch with respect to the pedal.

Fig. 4 is a detail view showing the resilient connection between the indicator arm and pedal.

Fig. 5 is a diagrammatic view of the electric circuit.

Fig. 6 is a cross sectional detail of the signal arm hereinafter described.

Referring more particularly to the drawings A indicates generally a portion of a motor vehicle or the like, including the hood B, dash board C, and the floor of the car D.

Arranged within the hood and secured upon the dash board C in any suitable manner is a substantially U-shaped bracket 5, the parallel limbs 6 of which are provided with alined openings in which the post 7 is journaled and projects through the top of the hood, and has secured to the upper end thereof, integrally or otherwise a signal arm 8, which is normally disposed in a straightaway position, but adapted to be turned to either the right or left to indicate the course the machine is about to take in its travel.

Projecting laterally from the post 7 at a point adjacent its lower end are oppositely extending lugs 9 with which one end of a pair of retractile springs 10 is suitably connected, the springs passing through the openings 11 in the dash board C and having their opposite ends connected to the vertical portions 12 of the independently operated pedals 13, the latter being mounted upon the rod 14 for rocking movement. The springs 10 normally maintain the foot engaging portion 15 of the pedals in spaced relation to the floor D of the car, and when either of the pedals is depressed with a view to turning the arm 8 in the desired direction, the springs are placed under tension, to return the arm and pedal to normal position subsequent to the release of the latter. The pedals 15 are so positioned with respect to the dash board C, that the latter serves as a stop to limit the return movement of either pedal to normal position and in order to prevent marring of the dash board I provide a buffer.

Both the post 7 and signal arm 8 are hollow, the former supporting a relatively large head light 17, while the latter has arranged therein a number of small electric lights 19 for the purpose of illuminating the arm at night. The arm 8 is preferably in the shape of an arrow, and preferably constructed from metal, including the glass panels 20 so that the arm can be readily seen when illuminated. The head light 17 may be permanently lighted if desired, but the lights 19 within the arm 8 are adapted to be intermittently lighted only when the arm is operated by means of the pedals 15. For this purpose I have illustrated in Fig. 4 a diagrammatic view of an electric circuit including a switch 20 disposed in convenient reach of the operator of the machine, and a normally open switch 21 disposed immediately beneath the adjacent edges of the pedals 15, so as to be operated when either of these pedals is depressed. It will be manifest that when the switch 20 is closed the head light will remain lighted, the current passing from a suitable source indicated at 22 which may be either a dynamo or a dry battery through the wire 23, switch 20, wire 24, wire 25 to the lamp, and back through the wires 26 and 27 to the source. It will of course be understood that if use of this light is not desired it may be extinguished by opening the switch 20.

The switch 21 preferably consists of a push button 28 having a relatively broad head disposed beneath the adjacent edges of the pedals 15, so as to be operated when either of these pedals is depressed, and thereby move the resilient contact 29 within engagement with the contact 30 whereupon the lights 19 will be illuminated. In this instance the current passes from the source 22 through the wire 27 to the lamp, and thence returns through the wires 31 to the switch 21, through the wire 32, wire 24 to the switch 20 and back through the wire 23 to the source 22. It is of course to be understood that upon release of the pedal the push button is returned to normal position and the switch 21 opened thereby extinguishing the lights 19.

The signal is not only simple in its construction, but is capable of being quickly and positively operated for the purpose intended. It is to be further understood that while I have shown and described one embodiment of the invention, such changes in the construction and arrangement of parts may be resorted to when desired as fall within the scope of the appended claim.

What is claimed is:—

A direction signal for vehicles comprising a U-shaped bracket secured upon the dash of a vehicle beneath the hood and having vertically alined horizontal arms, a post journaled through the arms of said bracket and extending vertically upwardly through and above the hood, a horizontally swinging indicator arm secured upon said post above the hood, a pair of lugs extending outwardly from the sides of said post at diametrically opposite points between the arms of said bracket and parallel with the dash, a pair of independent L-shaped pivoted pedals upon the other side of the dash, and a spring connected with each of said lugs, extending through a hole in the dash and connected with the vertical arm of a pedal, said dash being engaged by the upper ends of the vertical arms of said levers for limiting their upward movement.

In testimony whereof I affix my signature in presence of two witnesses.

MINNIE E. SMITH.

Witnesses:
W. Y. RUMNEY,
L. T. SMITH.